(12) United States Patent
Sonasath et al.

(10) Patent No.: US 10,477,398 B2
(45) Date of Patent: Nov. 12, 2019

(54) METHOD OF PROVIDING SECURE ACCESS TO HOTEL IOT SERVICES THROUGH MOBILE DEVICES

(71) Applicant: Samsung Electronics Co., Ltd, Suwon-si (KR)

(72) Inventors: Moiz K Sonasath, Sunnyvale, CA (US); Sanjeev Verma, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 15/268,511

(22) Filed: Sep. 16, 2016

(65) Prior Publication Data

US 2018/0084424 A1   Mar. 22, 2018

(51) Int. Cl.
| | |
|---|---|
| *H04W 12/08* | (2009.01) |
| *H04L 29/06* | (2006.01) |
| *G06Q 10/02* | (2012.01) |
| *H04W 12/06* | (2009.01) |
| *H04W 4/70* | (2018.01) |

(52) U.S. Cl.
CPC ............ *H04W 12/08* (2013.01); *G06Q 10/02* (2013.01); *H04L 63/0861* (2013.01); *H04W 12/06* (2013.01); *H04W 4/70* (2018.02)

(58) Field of Classification Search
None
See application file for complete search history.

(56) References Cited

U.S. PATENT DOCUMENTS

| | | | |
|---|---|---|---|
| 7,315,823 | B2 | 1/2008 | Brondrup |
| 8,793,784 | B2 | 7/2014 | Metivier et al. |
| 8,805,717 | B2 | 8/2014 | Fleming et al. |
| 2004/0128160 | A1 | 7/2004 | Fujimoto |
| 2009/0313053 | A1 | 12/2009 | Gengarella et al. |
| 2012/0011033 | A1 | 1/2012 | Salgia |
| 2014/0244001 | A1 | 8/2014 | Glickfield et al. |
| 2015/0026772 | A1 | 1/2015 | Verma |

(Continued)

FOREIGN PATENT DOCUMENTS

| | | |
|---|---|---|
| CN | 103729817 A | 4/2014 |
| EP | 2 495 960 A1 | 9/2012 |

(Continued)

OTHER PUBLICATIONS

International Search Report and Written Opinion regarding International Application No. PCT/KR2017/010135, dated Dec. 11, 2017, 13 pages.

(Continued)

*Primary Examiner* — Jason Chiang

(57) ABSTRACT

A system and method for secure access to IoT devices using a mobile device. The mobile device includes a memory configured to store a private value thereon. The mobile device also includes a processor. The processor is configured establish a secure connection with the between the mobile device and a trusted server using the private value, receive a token from the a third party server via the trusted server, transmit the token to a provisioning server via the trusted server, receive an Internet of Things (IoT) profile from the provisioning server via the trusted server, and configure an IOT gateway based on the IoT profile.

20 Claims, 9 Drawing Sheets

(56) References Cited

U.S. PATENT DOCUMENTS

| | | | |
|---|---|---|---|
| 2015/0222621 A1* | 8/2015 | Baum | H04W 4/70 726/9 |
| 2015/0304851 A1* | 10/2015 | Chen | H04W 4/80 713/172 |
| 2015/0326701 A1 | 11/2015 | Robfogel et al. | |
| 2015/0334562 A1 | 11/2015 | Perold et al. | |
| 2015/0381737 A1 | 12/2015 | Quinn et al. | |
| 2016/0044111 A1 | 2/2016 | Lee et al. | |
| 2016/0044472 A1 | 2/2016 | Person | |
| 2016/0087933 A1 | 3/2016 | Johnson et al. | |
| 2016/0105292 A1 | 4/2016 | Choi et al. | |
| 2016/0105314 A1* | 4/2016 | Logue | F24F 11/30 726/4 |
| 2016/0112429 A1* | 4/2016 | Sundaresan | H04L 63/08 726/4 |
| 2016/0156614 A1 | 6/2016 | Jain et al. | |
| 2016/0173447 A1* | 6/2016 | Achim | H04L 67/12 726/11 |
| 2016/0205106 A1* | 7/2016 | Yacoub | H04L 61/1511 726/28 |
| 2016/0227408 A1 | 8/2016 | Sherin et al. | |
| 2016/0241999 A1* | 8/2016 | Chin | H04W 4/021 |
| 2017/0018001 A1* | 1/2017 | Tunnell | G06Q 30/0255 |
| 2017/0034700 A1* | 2/2017 | Cohen | H04W 12/06 |
| 2017/0171747 A1* | 6/2017 | Britt | H04W 12/04 |
| 2017/0208057 A1* | 7/2017 | Wang | H04L 63/083 |

FOREIGN PATENT DOCUMENTS

| | | |
|---|---|---|
| EP | 2 620 919 A1 | 7/2013 |
| EP | 2709045 A1 | 3/2014 |
| EP | 2938112 A1 | 10/2015 |
| WO | 2011162591 A1 | 12/2011 |
| WO | WO 2013/049730 A1 | 4/2013 |
| WO | WO 2015/175670 A1 | 11/2015 |
| WO | 2016/038457 A1 | 3/2016 |

OTHER PUBLICATIONS

"Improving the Guest Experience: How Technology is Changing the Hospitality Industry", Intelity White Paper, Apr. 2016, http://www.mclarenint.com/wp-content/uploads/2016/04/Improving-the-Guest-Experience-Intelity-Whitepaper-APR2016.pdf, 16 pages.

Tossell, David, "How 26 billion "Internet of Things" Devices will Impact the Hotel Industry", http://hotelexecutive.com/business_review/4299/how-26-billion-internet-of-things-devices-will-impact-the-hotel-industry, 4 pages.

Supplementary European Search Report dated Apr. 10, 2019 in connection with European Patent Application No. 17 85 1130, 7 pages.

* cited by examiner

METHOD OF PROVIDING SECURE ACCESS TO HOTEL IOT SERVICES THROUGH MOBILE DEVICES

TECHNICAL FIELD

This disclosure relates generally to Internet of Things (IoT). More specifically, this disclosure relates to secure access to IoT devices using a mobile device.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

SUMMARY

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services.

In a first embodiment, a mobile device includes a memory configured to store a private value thereon and a processor coupled to the memory. The processor is configured to establish a secure connection between the mobile device and a the trusted server, receive a token from the third party server via the trusted server, transmit the token to a provisioning server via the trusted server, and receive an Internet of Things (IoT) profile from the provisioning server via the trusted server.

In a second embodiment, a method for controlling an IOT gateway using a mobile device includes establishing a secure connection between the mobile device and a trusted server using a private value stored in the mobile device. The method also includes receiving a token at the mobile device from the third party server via the trusted server. The token is transmitted from the mobile device to a provisioning via the trusted server and the mobile device receives an Internet of Things (IoT) profile from the provisioning server via the trusted server. The method also includes configuring the IOT gateway based on the IoT profile.

In a third embodiment, a trusted server includes a memory and a. The processor is configured to establish a secure connection with a mobile device using a private value received from the mobile device, receive a token from a third party server and transmit the token to the mobile device, transmit the token to a provisioning server, receive an Internet of Things (IoT) profile from the provisioning server, and provide the IoT profile to the mobile device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

One or more embodiments described herein provide secure access to IoT devices of a third party (e.g., hotel, corporation, etc.). In one embodiment, a user may use a third party app on a mobile device to perform a task (e.g., make an on-line reservation) using a third party server via a trusted server. The mobile device includes a preconfigured key that is set at manufacturing time, and the preconfigured key is used to securely communicate between the mobile device and the trusted server. The third party server securely communicates with the mobile device via the trusted server. A time-bound token is securely communicated to the mobile device via the trusted server and stored in a secure area of the mobile device. At a certain later time when the time-bound token is presented to the third party server, the third party server generates a provisioning IoT profile that is based on user preferences, credentials, and/or access data. The provisioning IoT profile is securely transmitted from the third party server to the mobile device via the trusted server and stored in the secure area of the mobile device. The provisioning IoT profile gives the mobile device access to an IoT controller to control a plurality of IoT devices of the third party. The third party server configures the IoT controller so that the mobile device can control the IoT devices and also pre-configure the IoT devices based on the provisioning IoT profile.

Figure 1:
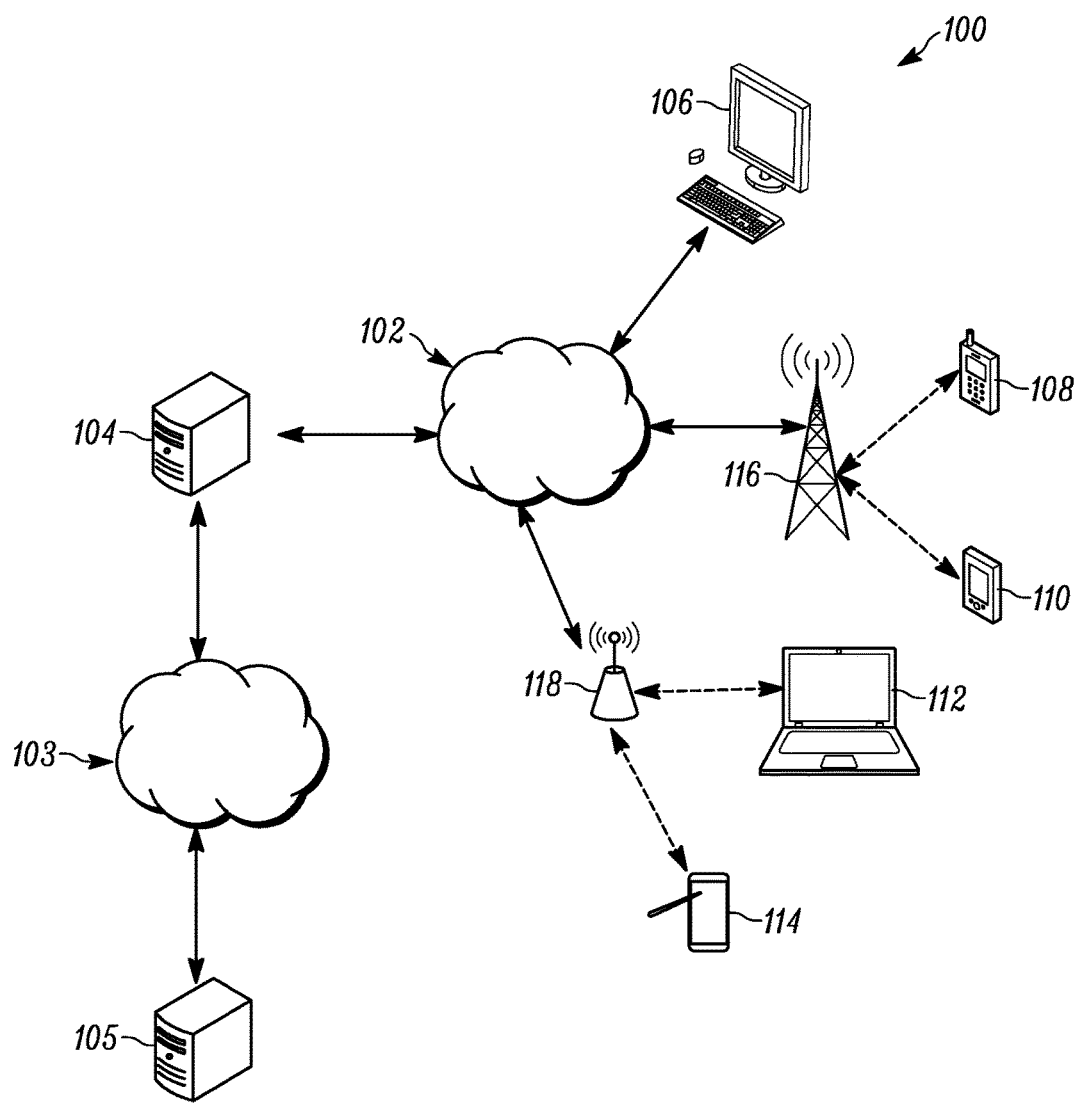
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102 and network 103, which facilitates communication between various components in the system 100. For example, the network 102, 103 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one trusted server 104 and various client devices 106-114. The network 103 facilitates communications between the least one trusted server 104 and a third party server 105. Each server 104, 105 includes any suitable computing or processing device that can provide computing services for one or more client devices. Each server 104, 105 could, for example, include one or more processing devices, one or more memories storing instructions and data, and one or more network interfaces facilitating communication over the network 102.

The server 104 is a trusted service manager (TSM) that plays a role in a near field communication (NFC) ecosystem. It acts as a neutral broker that sets up business agreements and technical connections with mobile network operators, phone manufacturers, or other entities controlling the secure element on mobile phones. The TSM enables service providers to distribute and manage their contactless applications remotely by allowing access to a secure element in NFC-enabled handsets.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, each client device may communicate securely with the third party server 105 via the trusted server 104.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
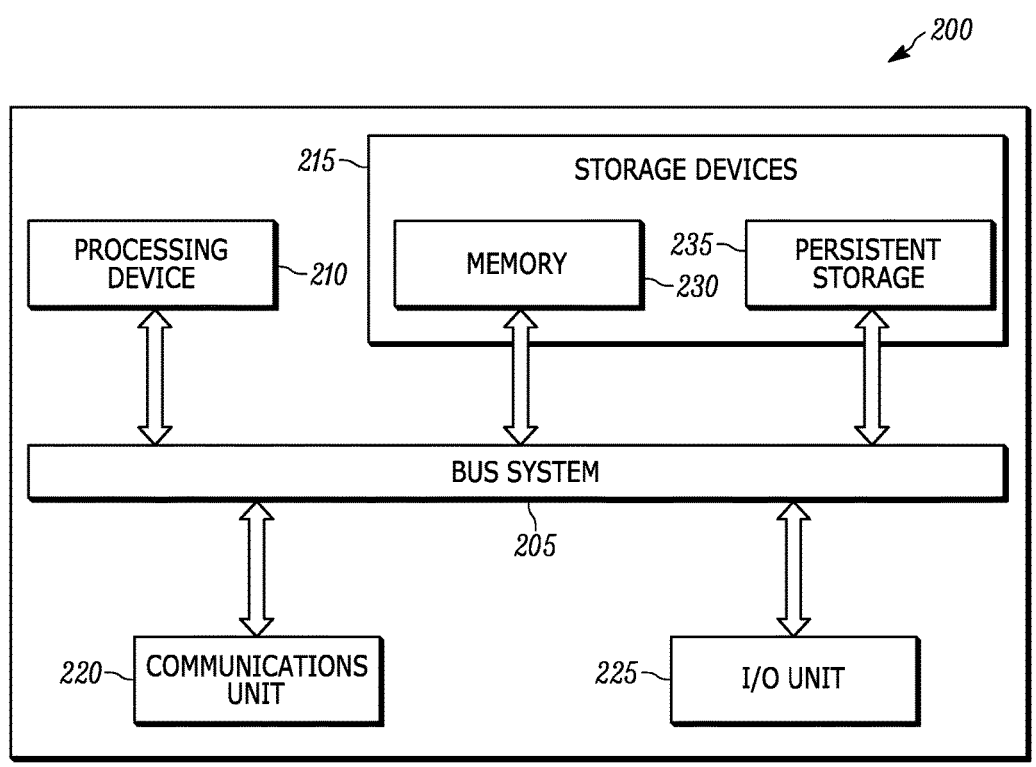
FIGS. 2 and 3 illustrate example devices in a computing system according to this disclosure.
Figure 3:
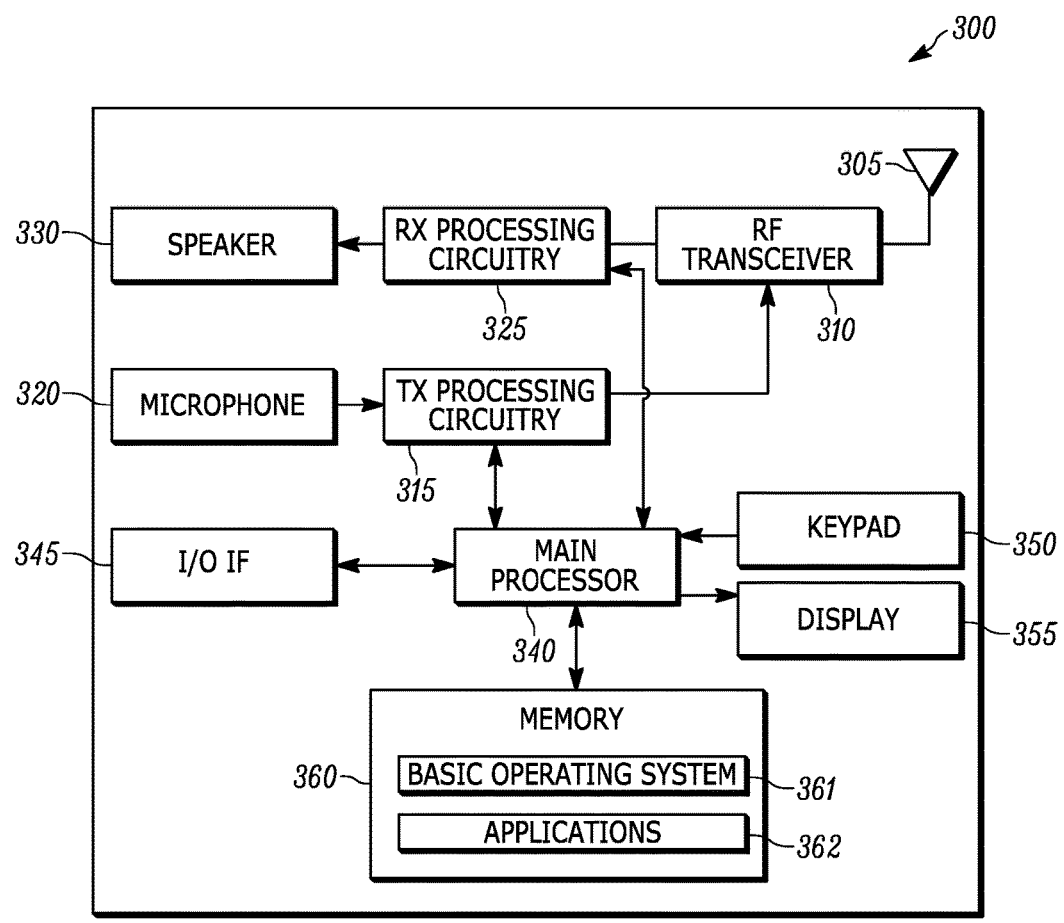

FIGS. 2 and 3 illustrate example devices in a computing system according to this disclosure. In particular, FIG. 2 illustrates an example server 200, and FIG. 3 illustrates an example client device 300. The server 200 could represent the server 104 or server 105 in FIG. 1, and the client device 300 could represent one or more of the client devices 106-114 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 or server 105 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the client device 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from external devices or an operator. The main processor 340 is also coupled to the I/O interface 345, which provides the client device 300 with the ability to connect to other devices such as laptop computers and handheld computers. The I/O interface 345 is the communication path between these accessories and the main processor 340.

The main processor 340 is also coupled to the keypad 350 and the display 355. The operator of the client device 300 can use the keypad 350 to enter data into the client device 300. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

As described in more detail below, memory 360 includes a secure area in which a private value such as a private key may be stored therein. The secure area also stores a reservation token provided by the third party server 105 as well as an Internet of Things (IoT) profile to access an IoT controller in order to control one or more IoT devices.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
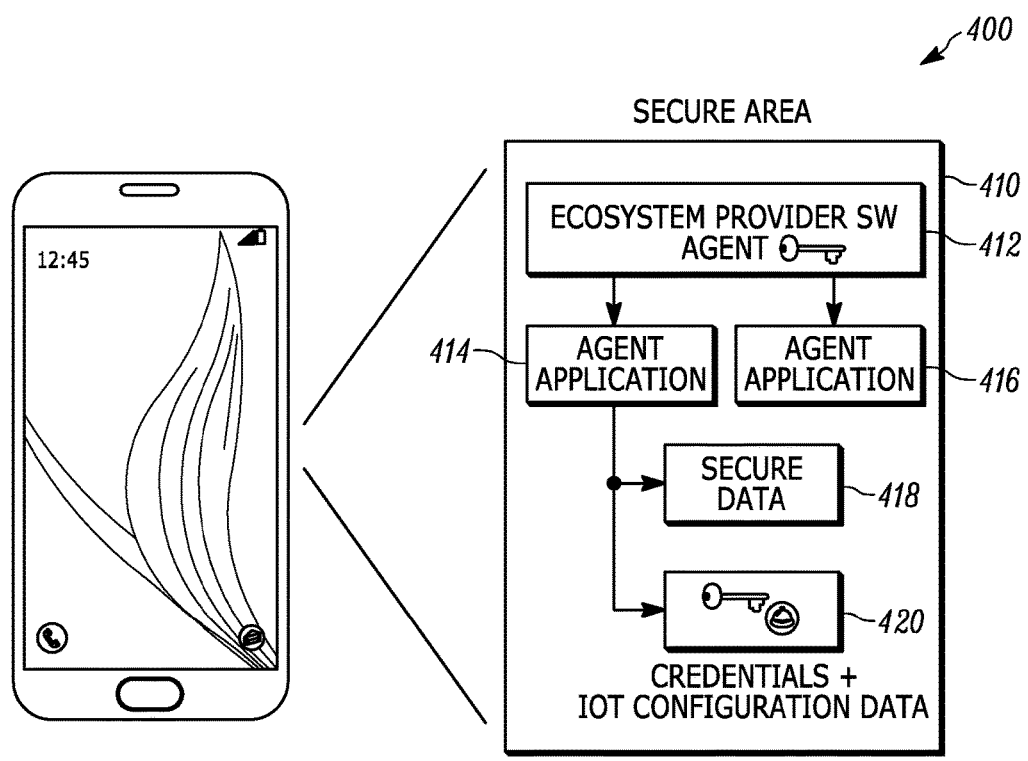
FIG. 4 illustrates an example client device according to this disclosure.

FIG. 4 illustrates an example client device according to this disclosure. As shown in FIG. 4, the client device or mobile device 400 includes a secure area 410 included in a memory (not shown). The secure area 410 includes an ecosystem provider software agent 412. The ecosystem provider software agent 412 may be software provided by a travel portal (e.g., Expedia®, Travelocity®, Hotels.com®, etc.) as a mobile application and stored in the secure area 410. The ecosystem provider software agent 412 may work in conjunction with one or more agent applications 414, 416. Agent applications 414, 416 may be provided by a hotel chain (e.g., Hilton®, Sheraton®, Holiday Inn®, etc.) or a company (Apple®, Google®, etc.) and stored in secure area 410.

Secure area 410 also stores secure data 418 as will be discussed below and a primary key 420. Primary key 420 is either preconfigured at manufacturing time or can be configured or flashed into the device's secure area using software (e.g., after proper user identification through documents/biometric data etc. at a specific location). The primary key 420 enables a security association between the mobile device 400 and the TSM, such as trusted server 104, thereby allowing the mobile device to securely communicate with the TSM and in turn allowing, e.g., hotels, to communicate securely with the mobile device through the usage of the TSM. The primary key 420 can be of any type and length (e.g., 64, 128, 256, 512 bytes) and can also include a user's biometric data (e.g., image recognition output or finger print) as part of the key. The primary key can be used to communicate securely between two mobile devices. The primary key can be shared among mobile devices so that, for example, members of a family have access to a hotel room or access to a family car.

Figure 5:
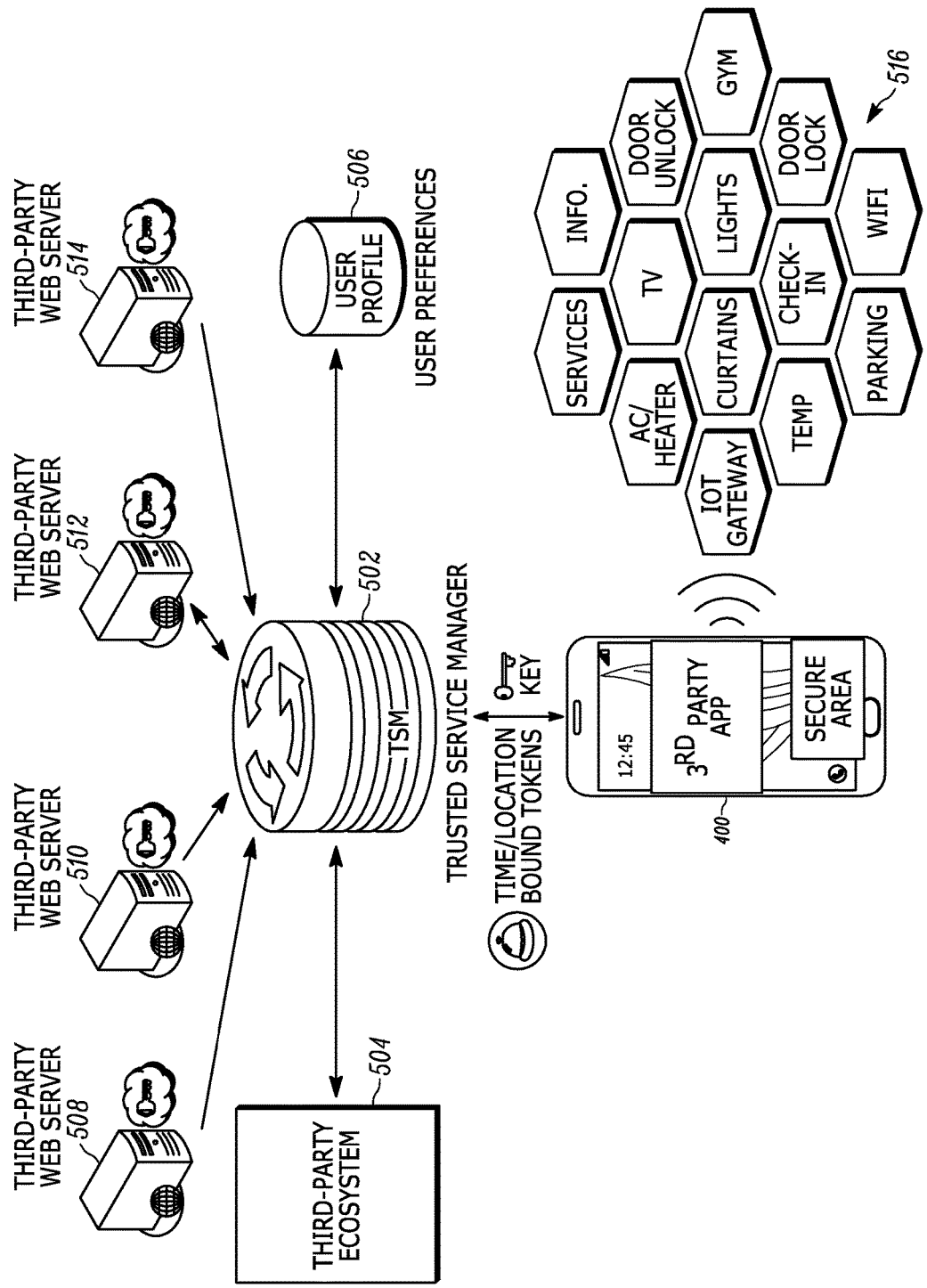
FIG. 5 illustrates an example system for gaining secure access to one or more third party IoT services according to this disclosure.

FIG. 5 illustrates an example system for gaining secure access to one or more third party IoT services according to this disclosure. As shown in FIG. 5, a mobile device 400 establishes a secure communication path with a trusted server 502 by sending a private key to the trusted server 502. The trusted server 502 is similar to trusted server 104 as shown in FIG. 1. Once the secure communication path is established, the mobile device may communicate with a third party ecosystem 504 via the trusted server 502 using the ecosystem provider software agent 412. The third party ecosystem may be travel portal or a company portal. A user profile 506 may also be stored in the third party ecosystem 504 using the mobile device 400 or any of client devices 106-114 as shown in FIG. 1. The mobile device also communicates with one or more third party servers 508-514 via the trusted server 502 using one of the agent application 414, 416. Third party servers 518-514 are similar to third party server 105 of FIG. 1. As will be discussed below, one or more of the third party servers 508-514 provides one or more time/location bound tokens that the mobile device may use to access IoT services 516.

FIGS. 6-9 will be used to describe a process for making a hotel reservation and checking into a hotel to use IoT services provided by the hotel. However, the embodiments described herein are not limited to using IoT services in a hotel and may be used in conjunction with any location that provides IoT services such as a hotel, company, sporting event, connected car, hospital, factory, shopping mall or stores, prisons, schools, theme parks.

Figure 6:
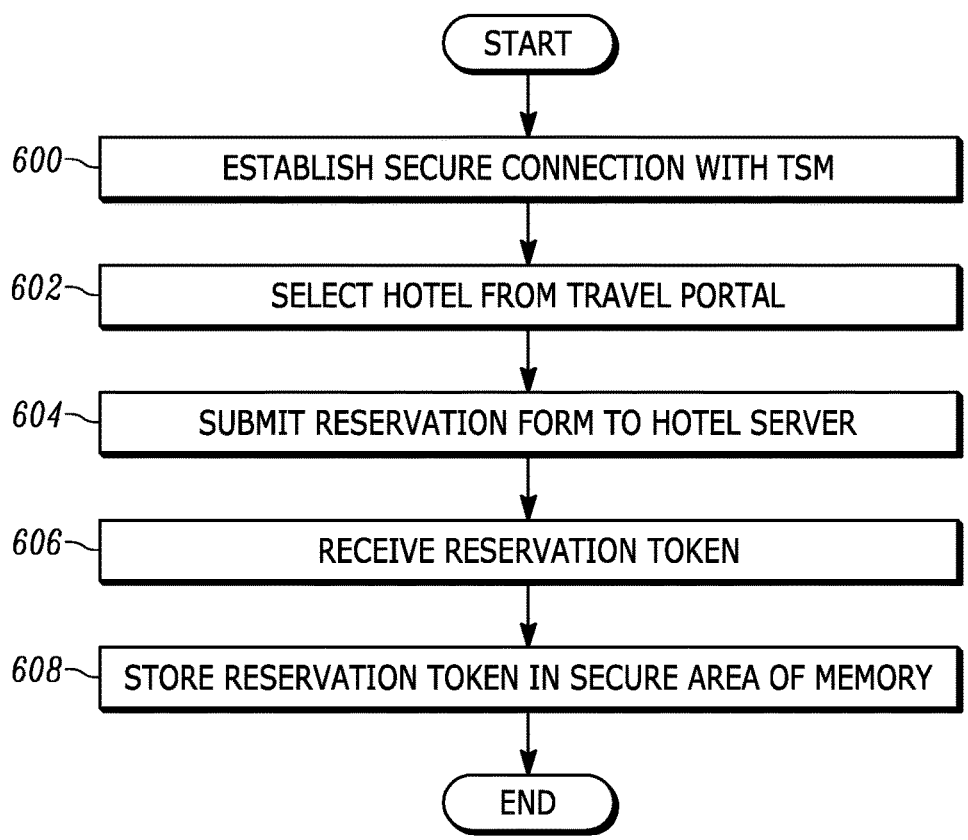
FIG. 6 illustrates a flowchart for obtaining a reservation token according to this disclosure.
Figure 7:
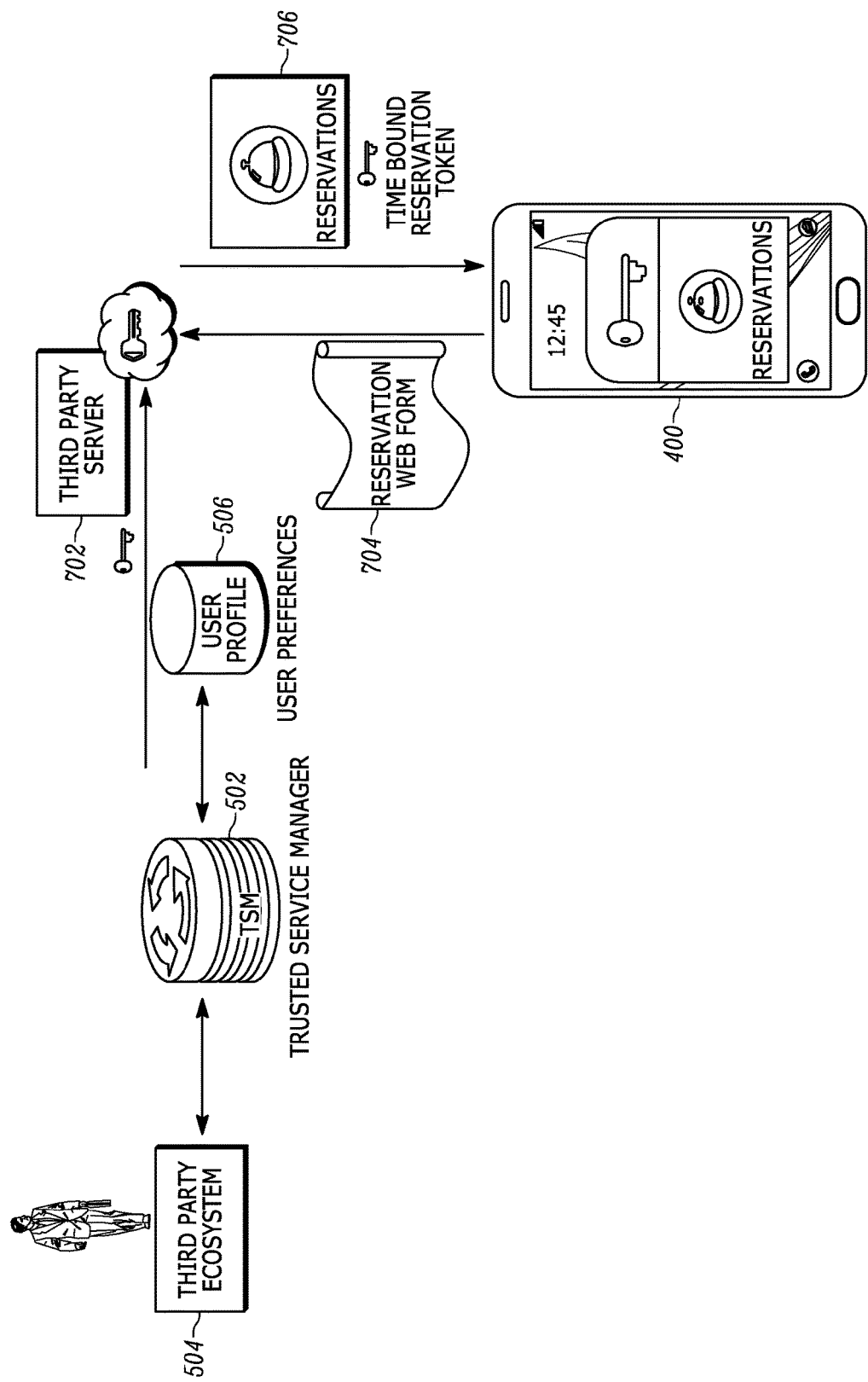
FIG. 7 illustrates an example system for obtaining a reservation token according to this disclosure.

FIG. 6 illustrates a flowchart for obtaining a reservation token according to this disclosure and FIG. 7 illustrates an example system for obtaining a reservation token according to this disclosure.

As shown in FIGS. 6 and 7, in process 600, a mobile device 400 establishes a secure communication path with the trusted server 502. Once the secure communication path is established, the mobile device 400 communicates with a third party ecosystem 504 such as Expedia® or Hotels.com® to select a hotel in process 602. The hotel may be selected by the user or based on a user profile 506 provided by the user in advance and stored on the mobile device 400 or with the third party ecosystem 504. Once the hotel is selected, the user uses his or her credentials (e.g., user name, password, credit card information, biometric data etc.) to login to the hotel website and fill out a reservation form 704 and submits the reservation form in process 604 to the third party server 702 belonging to the selected hotel. The third party server 702 then transmits a time/location reservation token 706 to the mobile device 400 via the trusted server 502 and the mobile device 400 receives the time/location reservation token 706 in process 606. The time/location reservation token 706 is generated by the hotel and sent to the mobile device 400 and stored as secure data 418 in the secure area 410 after a successful reservation in process 608. The time/location reservation token 706 is active during the active reservation period for a specific location. As will be described below, upon check-in, this time/location reservation token 706 (from the mobile device 400) is sent to a hotel provisioning server via the TSM for verification.

Figure 8:
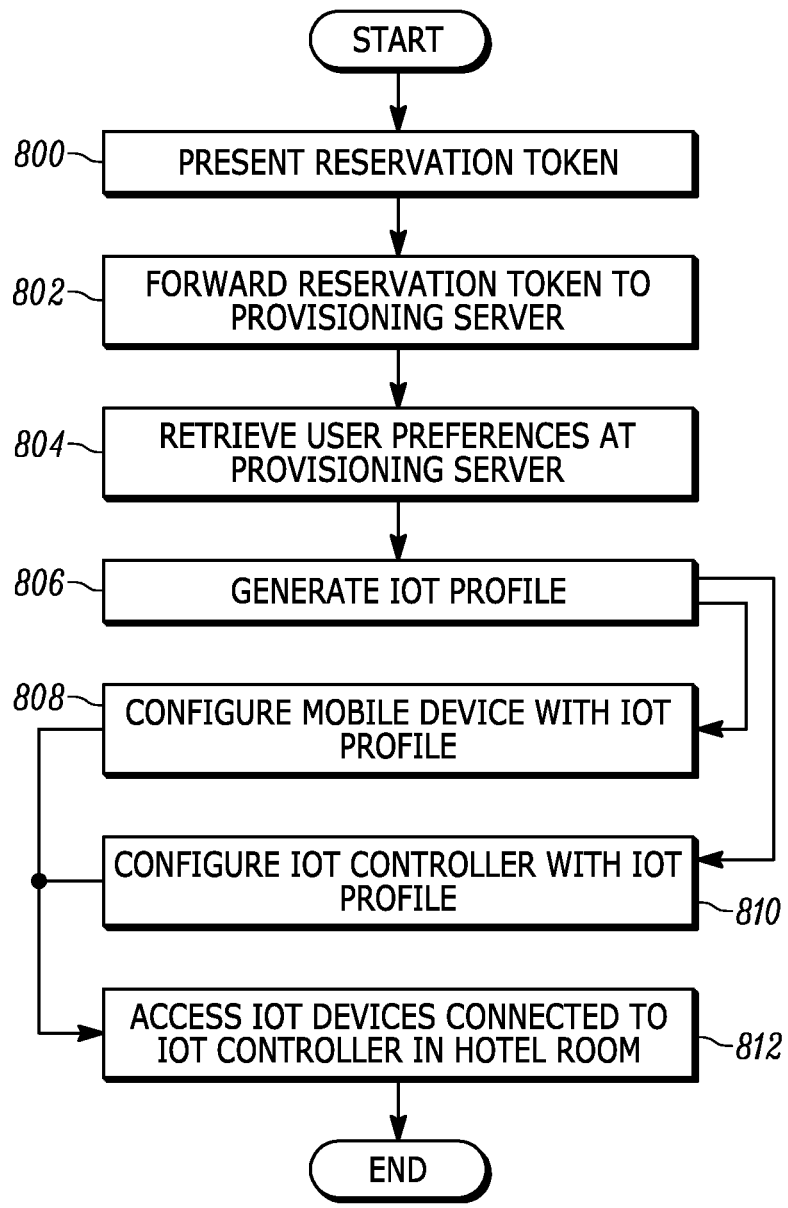
FIG. 8 illustrates a flowchart for accessing a hotel IoT system according to this disclosure.
Figure 9:
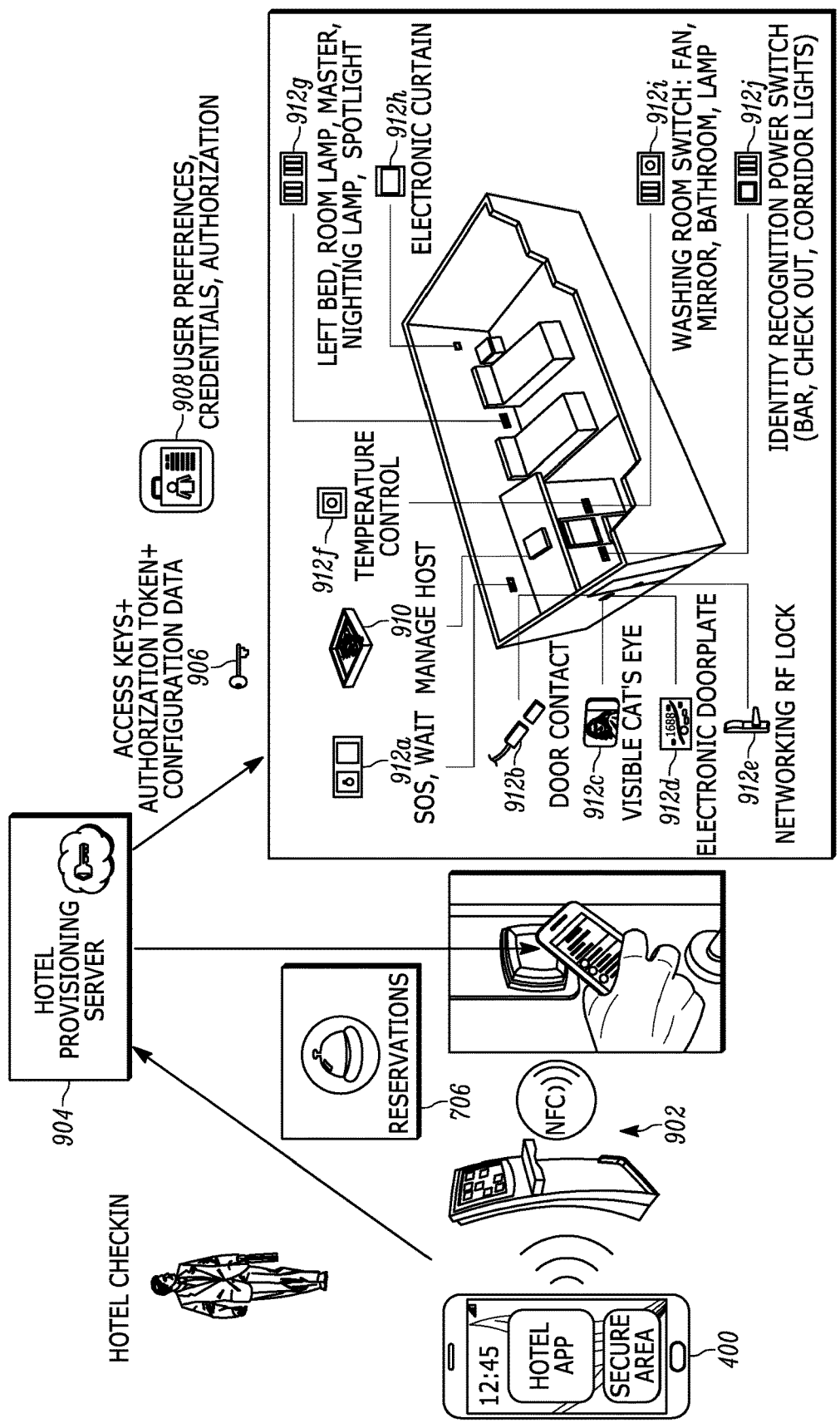
FIG. 9 illustrates an example system for accessing a hotel IoT system according to this disclosure.

FIG. 8 illustrates a flowchart for accessing a hotel IoT system according to this disclosure and FIG. 9 illustrates an example system for accessing a hotel IoT system according to this disclosure.

As shown in FIGS. 8 and 9, in process 800, the mobile device presents the time/location reservation token 706 to a hotel kiosk 902 using a near field communication (NFC) method such as Wi-Fi®, Bluetooth®, radio frequency signals, etc. The hotel kiosk 902 forwards the reservation token to 706 to a hotel provisioning server 904 in process 802. The hotel provisioning server 904 retrieves user preferences stored in the user profile 506 from the third party ecosystem 504 in process 804 and generates an IoT profile in process 806. The IoT profile includes configuration data, access keys, and authorization data that are generated based on the user preferences, credentials, and reservation data.

In process 808, the hotel provisioning server 904 transfers an IOT profile to the mobile device 400 via the trusted server (not shown) that includes a time/location bound access key and authorization token 906 (hereinafter "authorization token 906"). The authorization token 906 is stored as secure data 418 in the secure area 410. The authorization token 906 enables the mobile device to securely communicate with an IoT gateway 910 of the hotel thereby enabling the mobile device 400 to control a plurality of IoT devices 912a-912j and access other hotel services. In process 810, the IoT profile (e.g., user preferences, credentials, and/or authorization 908) is also transmitted by the hotel provisioning server 904 to the IoT gateway 910 to enable the user to use the plurality of IoT device 912a-912j connected to the IoT gateway 910. In process 812, the mobile device 400 accesses the IoT gateway by providing the authorization token 906 to the IoT gateway 910 using NFC methods to establish a secure communication path between the mobile device 400 and the IoT gateway 910. This permits the mobile device to control the various IoT devices 912a-912j connected to the IoT gateway such as, but not limited to, help or room service device 912a, a door contact, 912b, a door camera 912c, an electronic doorplate 912d, a networking radiofrequency lock 912e, a thermostat 912f, lighting controller 912g, electronic curtain 912h, bathroom fixtures (e.g., fan, mirror, lights) 912i, and identity recognition power switches (e.g., bar, check out, lights, etc.) 912j.

Although the figures illustrate different examples of devices, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile device, comprising:
   a memory configured to store a private value thereon; and
   a processor coupled to the memory, wherein the processor is configured to:
      establish a secure connection between the mobile device and a trusted server using the private value,
      receive a token from a third party server via the trusted server,
      transmit the token to a provisioning server via the trusted server, and
      receive an Internet of Things (IoT) profile from the provisioning server via the trusted server.

2. The mobile device of claim 1, wherein the private value is stored in the memory at a manufacturing time.

3. The mobile device of claim 1, wherein the private value is flashed onto the memory.

4. The mobile device of claim 1, wherein the private value includes biometric data.

5. The mobile device of claim 1, wherein the token includes at least one of a time or location.

6. The mobile device of claim 1, wherein the processor is configured to:
   transmit a reservation form to the third party server via the trusted server.

7. The mobile device of claim 1, wherein the IoT profile is based on at least one of user preferences, user credentials, or reservation data.

8. The mobile device of claim 1, wherein the IoT profile includes time/location bound access key and an authorization token.

9. The mobile device of claim 1, wherein the IoT profile is configured to provide the mobile device with access to an IoT gateway configured to control a plurality of IoT devices.

10. A method for controlling an IOT gateway using a mobile device, the method comprising:
    establishing a secure connection between the mobile device and a trusted server using a private value stored in the mobile device;
    receiving, by the mobile device, a token from a third party server via the trusted server;
    transmitting, by the mobile device, the token to a provisioning server via the trusted server;
    receiving an Internet of Things (IoT) profile at the mobile device from the provisioning server via the trusted server; and
    configuring the IOT gateway based on the IoT profile.

11. The method of claim 10, wherein the private value is stored in a memory of the mobile device at a manufacturing time.

12. The method of claim 10, wherein the private value is flashed onto a memory of the mobile device.

13. The method of claim 10, wherein the private value includes biometric data.

14. The method of claim 10, wherein the token includes at least one of a time or location.

15. The method of claim 10, wherein the IoT profile is based on at least one of user preferences, user credentials, or reservation data.

16. The method of claim 10, wherein the IoT profile includes a time/location bound access key and authorization token.

17. The method of claim 10, wherein the IoT gateway is configured to control a plurality of IoT devices.

18. The method of claim 17, further comprising configuring the plurality of IoT devices based on the IoT profile.

19. A trusted server comprising:
    a memory; and
    a processor coupled to the memory, wherein the processor is configured to:
       establish a secure connection with a mobile device using a private value received from the mobile device,
       receive a token from a third party server and transmit the token to the mobile device,
       transmit the token to a provisioning server,
       receive an Internet of Things (IoT) profile from the provisioning server, and
       provide the IoT profile to the mobile device.

20. The trusted server of claim 19, wherein the processor is further configured to:
    receive a reservation form from the mobile device and transmit the reservation form to the third party server.

* * * * *